ROBERT B. HUGUNIN.

Improvement in Clothes Wringers.

No. 4,638. Reissued Nov. 21, 1871.

WITNESSES.

John S. Hollingshead

John D. Bloor

INVENTOR.

R B Huguenin

AM. PHOTO-LITHOGRAPHIC CO. N.Y. (OSBORNE'S PROCESS.)

UNITED STATES PATENT OFFICE.

ROBERT B. HUGUNIN, OF CLEVELAND, OHIO, ASSIGNOR TO ALBERT H. SPENCER, OF PROVIDENCE, RHODE ISLAND.

IMPROVEMENT IN CLOTHES-WRINGERS.

Specification forming part of Letters Patent No. 75,425, dated March 10, 1868; reissue No. 4,638, dated November 21, 1871.

*To all whom it may concern:*

Be it known that ROBERT B. HUGUNIN, of Cleveland, county of Cuyahoga, State of Ohio, has invented a new and useful Improvement in Clothes-Wringers; and it is hereby declared that the following is a full, clear, and exact description of the same, reference being had to the accompanying drawing making a part of this specification.

This invention consists in the application of helical gearing to the shafts of wringing-machines, either single or in duplicate, and one or both ends of the said shafts; and it is herein shown with a stop to hold the gears in adjustment, which is arranged substantially as hereinafter described.

Figure 1:
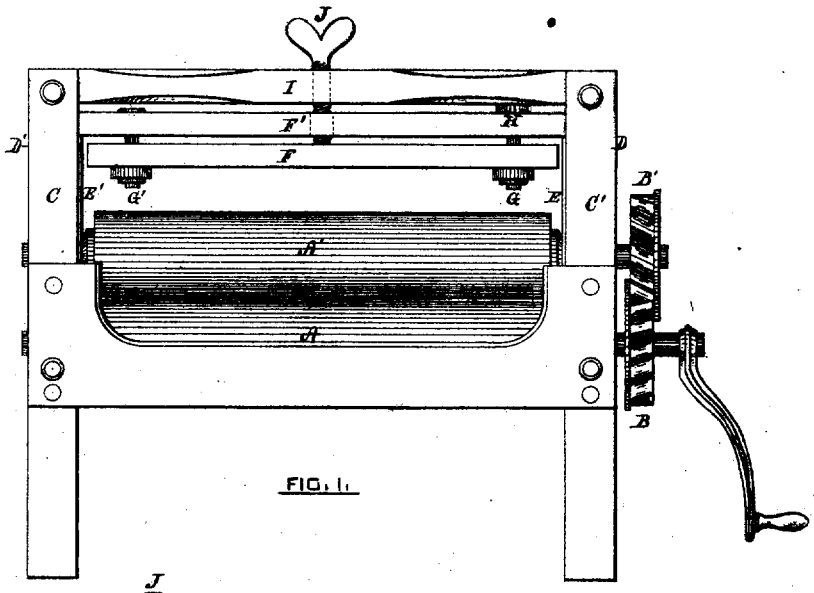
Figure 3:
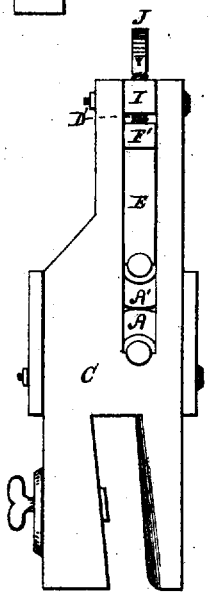
Figure 2:
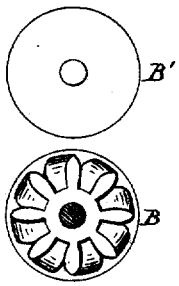

Figure 1 shows a wringer complete, with helical-gearing improvements applied to it; Fig. 2, front and back views of single helical gearing; Fig. 3, view of the end of the wringer opposite the gearing.

Similar letters of reference indicate corresponding parts in the drawing.

To enable those skilled in the art to fully understand said invention, I will proceed to describe its construction and operation.

In the drawing, A and A′ represent the two elastic rollers used in a wringing-machine; B and B′, right-and-left helical gear-wheels, securely attached to the shafts of the rollers A and A′; C and C′, end pieces of the frame in which the rollers work; D and D′, slots in the end pieces C and C′; E and E′, journal-blocks, resting on the journals of the upper shaft; F and F′, spring-bars, the upper of which rests on the tops of the journal-blocks E and E′; G and G′, common bolts and nuts used to connect the springs together loosely; H, small projection, block or rubber, secured at the top of the spring-bar F, near the end, used as a stop to prevent the gearing from getting out of adjustment. A screw passing down through the stiffening piece would answer the same purpose at this point. I, stiffening piece extending across the top of the frame, with its ends securely bolted in the slots D and D′; J, adjusting screw passing through the stiffening piece I, then down loosely through the upper spring-bar to the lower one, where its point rests. By means of this screw the pressure upon the rollers in wringing is regulated.

In operation, this wringer is used the same as any other, the advantages secured by said improvement being a constant contact of the teeth of the gear-wheels, owing to their spiral form and the absence of any jerking motion, so objectionable in gearing where the contact is not continuous.

Having thus described said invention, what I claim as the invention of the said ROBERT B. HUGUNIN, and desire to secure by Letters Patent, is—

1. The spiral cog-wheels herein described, whether they be made single or double, and whether placed at one or both ends of the rollers, with the means to prevent their becoming disconnected, in combination with the elastic rollers of a wringing-machine, substantially as and for the purposes specified.

2. The combination of the supporting-frame C C′, elastic pressure-rollers A A′, and single or double spiral cog-wheels B B′, substantially as and for the purposes specified.

ALBERT H. SPENCER.

Witnesses:
H. W. SPENCER,
H. K. PORTER.

(91)